US005854476A

United States Patent [19]

Goodwin, III

[11] Patent Number: 5,854,476

[45] Date of Patent: Dec. 29, 1998

[54] METHOD OF DISPLAYING A PRODUCT RESTRICTION MESSAGE BY AN ELECTRONIC PRICE LABEL

[75] Inventor: John C. Goodwin, III, Suwanee, Ga.

[73] Assignee: NCR Corporation, Dayton, Ohio

[21] Appl. No.: 726,595

[22] Filed: Oct. 7, 1996

[51] Int. Cl.$^6$ .................... G06K 15/00

[52] U.S. Cl. .................... 235/383; 235/472

[58] Field of Search .................... 235/383, 472

[56] References Cited

U.S. PATENT DOCUMENTS

| | | | |
|---|---|---|---|
| 4,002,886 | 1/1977 | Sundelin . | |
| 4,500,880 | 2/1985 | Gomersall et al. | 340/825.35 |
| 4,924,363 | 5/1990 | Kornelson | 362/125 |
| 5,172,314 | 12/1992 | Poland et al. | 364/401 |
| 5,448,226 | 9/1995 | Failing, Jr. et al. | 340/825.35 |
| 5,461,561 | 10/1995 | Ackerman et al. | 235/383 |
| 5,465,085 | 11/1995 | Caldwell et al. | 235/383 |
| 5,572,653 | 11/1996 | De Temple et al. | 235/383 |
| 5,583,487 | 12/1996 | Ackerman et al. | 235/383 |

*Primary Examiner*—Harold Pitts
*Attorney, Agent, or Firm*—Paul W. Martin; Peter H. Priest

[57] ABSTRACT

A method of displaying a product restriction message by an electronic price label which uses a product restriction indicator. The product restriction message is stored with the product restriction indicator in a first location. The product restriction indicator is stored in a second location. A control message addressed to the EPL is created by reading the product restriction indicator for the EPL from the second location and reading the product restriction message from the first location. The control message to the EPL is transmitted. The control message is received by the EPL. Finally, the product restriction message is displayed by the EPL. The first location may be a price look-up (PLU) file and/or an EPL data file.

14 Claims, 3 Drawing Sheets

METHOD OF DISPLAYING A PRODUCT RESTRICTION MESSAGE BY AN ELECTRONIC PRICE LABEL

CROSS-REFERENCE TO RELATED APPLICATION

The present invention is related to the following commonly assigned and co-pending U.S. applications:

"Method Of Displaying A Government Program Message By An Electronic Price Label", filed Oct. 7, 1996 invented by Goodwin, and having a Ser. No. 08/726,594 and "Method of Displaying Promotional Information By An Electronic Price Label", filed Oct. 7, 1996 invented by Goodwin, and having a Ser. No. 08/726596 .

BACKGROUND OF THE INVENTION

The present invention relates to electronic signage, and more specifically to a method of displaying a product restriction message by an electronic price label (EPL).

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

Certain items, such as alcoholic beverages, are restricted by law. Such laws may require that identification be presented to a cashier during purchase of these items or that the items not be sold on certain days. Traditionally, these items have been marked with special tags or paper price labels. However, these tags and paper price labels must be installed manually, thereby increasing the cost and setup time associated with these items.

Therefore, it would be desirable to provide a method of displaying a product restriction message by an EPL that avoids the use of paper tags or labels.

SUMMARY OF THE INVENTION

In accordance with the teachings of the present invention, a method of displaying a product restriction message by an electronic price label (EPL) is provided.

A method of displaying a product restriction message by an electronic price label (EPL) includes the steps of storing the product restriction message with a product restriction indicator associated with the product restriction message in a first location, storing the product restriction indicator in a second location, creating a control message addressed to the EPL including the substeps of reading the product restriction indicator for the EPL from the second location and reading the product restriction message from the first location, transmitting the control message to the EPL, receiving the control message by the EPL, and displaying the product restriction message by the EPL.

The second location may be a price look-up (PLU) file in which product restriction indicator is stored within the record of the item. The second location may also be an EPL data file in which the product restriction indicator is stored within a record of the EPL. In the latter case, the product restriction indicator may be copied from the PLU file to the EPL data file.

It is accordingly an object of the present invention to provide a method of displaying a product restriction message by an EPL.

It is another object of the present invention to provide a method of displaying a product restriction message by an EPL that makes paper tags and labels unnecessary.

It is another object of the present invention to provide a method of displaying a product restriction message by an EPL that displays special text or graphics.

It is another object of the present invention to provide a method of displaying a product restriction message by an EPL that makes use of a product restriction indicator in a price look-up file.

BRIEF DESCRIPTION OF DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
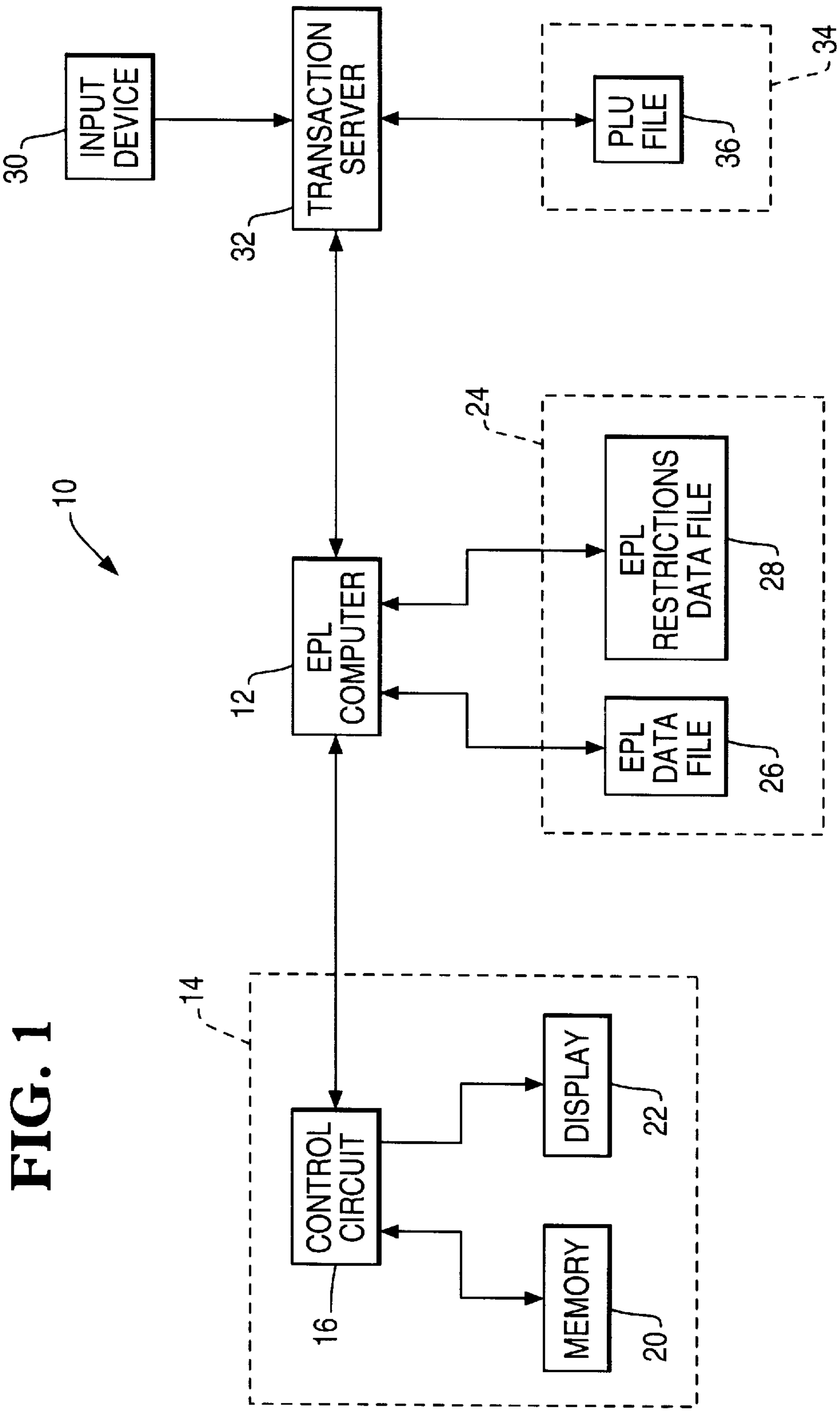
FIG. 1 is a block diagram of a store system.

Referring now to FIG. 1, store system 10 includes electronic price label (EPL) computer 12 and EPL 14. EPL computer 12 and EPL 14 may communicate with each other using wireless communication, cable communication, or a combination of both.

EPL computer 12 records, schedules, and transmits all messages to EPL 14 and analyzes status messages from EPL 14. Messages from EPL computer 12 include price change messages and diagnostic messages.

EPL computer 12 transmits a message containing a product restriction message from EPL product restriction data file 28.

Product restriction data within EPL product restriction data file 28 includes product restriction messages and a product restriction indicator which uniquely identifies each product restriction message. Product restriction messages identify items eligible for purchase under special product restrictions, such as the food stamp program and women with infant children (WIC) program. Such items have traditionally been identified using paper shelf labels or shelf talkers. Product restriction messages may include text and/or special graphic images. Control circuit 16 may display price separately, or as an integral part of a product restriction message. The product restriction messages and product restriction indicators are arranged as a table in EPL product restriction data file 28, such as the one shown in Table I.

TABLE I

| Indicator | Product Restriction Message |
|---|---|
| 00 | (No message) |
| 01 | ID (Identification required) |
| 02 | NO SALE |
| 03 | (both message 01 and message 02 displayed) |

EPL computer 12 maintains and uses EPL data file 26, Which contains item information, identification information, item price verifier information, and status information for EPL 14 and other EPLs within system 10.

Storage medium 24 stores EPL data file 26 and EPL product restriction data file 28.

EPL 14 is one of many EPLs within system 10. EPL 14 includes control circuit 16, memory 20, and display 22.

Control circuit 16 controls the internal operation of EPL 14. Control circuit 16 stores receives messages from EPL computer 12 and transmits response messages to EPL computer 12. Control circuit 16 also controls the display of price and product restriction messages, including blinking.

Upon receiving a message containing a product restriction message, control circuit 16 stores the product restriction message in memory 20 and displays the product restriction message using display 22.

Memory 20 stores product restriction messages and other data necessary for the proper operation of system 10.

Display 22 displays price and product restriction messages. Display 22 is preferably a liquid crystal display (LCD).

Transaction server 32 is a host to a plurality of transaction terminals and its primary function is to provide price and item information to the transaction terminals from a price look-up (PLU) file 36. Transaction server 32 and EPL computer 12 may also be one computer.

Under the method of the present invention, PLU file 36 also contains product restriction indicators for preselected items. Product restriction indicators may be added to PLU file 36 by an operator using input device 30. Input device 30 may be a keyboard or other suitable input device.

Storage medium 34 contains PLU file 36.

Figure 2:
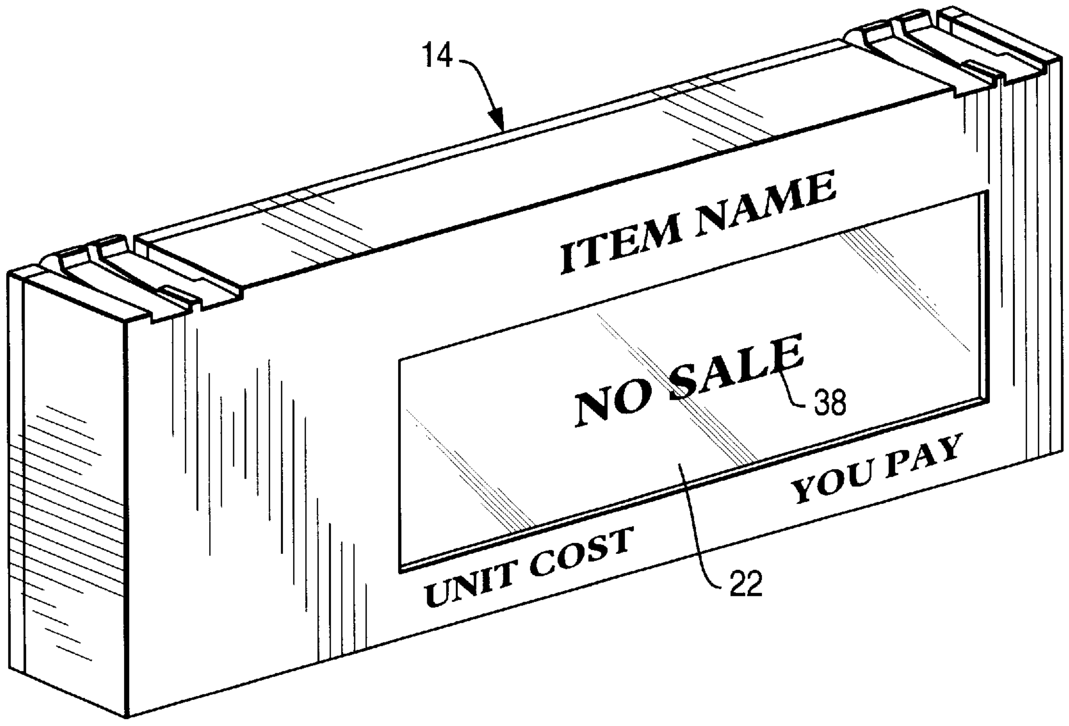
FIG. 2 is a perspective view of an EPL displaying a product restriction message.

Turning now to FIG. 2, EPL 14 is shown in more detail. The product restriction message 38 identified by product restriction indicator "02" in Table 1 is shown, and identifies the item as requiring identification for purchase and not being available for sale.

Figure 3:
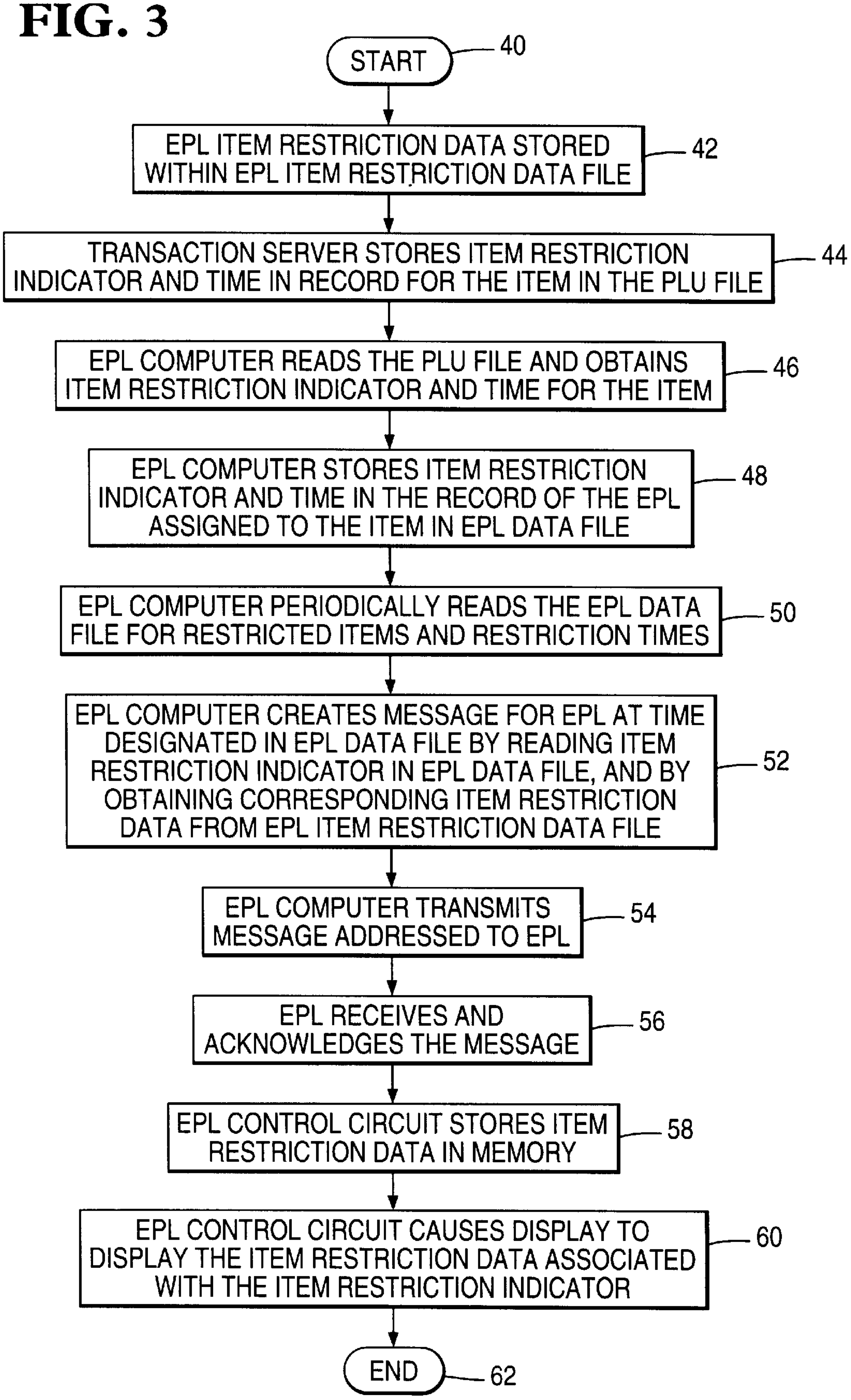
FIG. 3 is a flow diagram illustrating a method of displaying a product restriction message.

Turning now to FIG. 3, a method of displaying product restriction messages begins with START 40.

In step 42, EPL product restriction data is stored within EPL product restriction data file 28.

In step 44, input device 30 records a product restriction indicator entered for an item by an operator.

In step 46, transaction server 32 stores the product restriction indicator in the item's record in PLU file 36.

In step 48, EPL computer 12 reads PLU file 36 and obtains the product restriction indicator.

In step 50, EPL computer 12 stores the product restriction indicator in EPL data file 26.

In step 52, EPL computer 12 creates a message for EPL 14 by reading the product restriction indicator in EPL data file 26. EPL computer 12 obtains a product restriction message corresponding to the item's product restriction indicator from EPL product restriction data file 28.

In step 54, EPL computer 12 transmits the message addressed to EPL 14.

In step 56, EPL 14 receives and acknowledges the message.

In step 58, control circuit 16 stores the product restriction message in memory 20.

In step 60, control circuit 16 causes display 22 to display the product restriction message associated with the product restriction indicator.

In step 62, the method ends.

Although the present invention has been described with particular reference to certain preferred embodiments thereof, variations and modifications of the present invention can be effected within the spirit and scope of the following claims.

What is claimed is:

1. A method of displaying a product restriction message by an electronic price label (EPL) comprising the steps of:

storing the product restriction message with a product restriction indicator associated with the product restriction message in a first location;

storing the product restriction indicator in a second location;

creating a control message addressed to the EPL including the substeps of reading the product restriction indicator for the EPL from the second location; and reading the product restriction message from the first location;

wirelessly transmitting the control message to the EPL;

receiving the control message by the EPL; and electronically displaying the product restriction message by the EPL.

2. The method as recited in claim 1, wherein the second location is a price look-up (PLU) file.

3. The method as recited in claim 1, wherein the second location is an EPL data file.

4. A method of displaying a product restriction message by an electronic price label (EPL) comprising the steps of:

storing the product restriction message and a product restriction indicator associated with the product restriction message in a product restriction data file;

storing the product restriction indicator in a price look-up (PLU) file;

reading the PLU file to obtain the product restriction indicator;

storing the product restriction indicator in an EPL data file;

creating a message addressed to the EPL including the substeps of reading the product restriction indicator for the EPL from the EPL data file; and reading the product restriction data file to obtain the product restriction message;

wirelessly transmitting the message to the EPL;

receiving the message by the EPL; and electronically displaying the product restriction message by the EPL.

5. An electronic price label (EPL) for displaying a product restriction message comprising:

a control circuit;

a memory;

a receiver for receiving a wirelessly transmitted control message including the product restriction message; and an electronic display which displays the product restriction message subject to control of the control circuit which also causes the product restriction message to be stored in the memory.

6. A electronic price label (EPL) system for displaying a product restriction message associated with a product restriction indicator comprising:

an EPL including an electronic display which displays the product restriction message for an item associated with the EPL; and a computer which transmits a control message which is addressed to the EPL and which contains the product restriction message for the product restriction indicator associated with the item.

7. The system as recited in claim 6, further comprising:

a table which links the product restriction indicator with the product restriction message; and a price look-up (PLU) file which contains a record of the item including the product restriction indicator;

wherein the computer reads the PLU file and the table to obtain the product restriction message for transmission to the EPL.

8. The system as recited in claim 7, further comprising:

an EPL data file which contains a record of the EPL including the product restriction indicator;

wherein the computer reads the PLU file for the product restriction indicator for the item, copies the product restriction indicator to the EPL data file, reads the EPL data file and the table to obtain the product restriction message for transmission to the EPL.

9. The method of claim 1 further comprising the steps of:

wirelessly transmitting a price for an item associated with the EPL obtained from a price look-up (PLU) file; and electronically displaying the price for the item by the EPL.

10. The method of claim 1 wherein the product restriction message indicates that identification is required to purchase an item associated with the EPL.

11. The method of claim 1 wherein the product restriction message indicates that an item associated with the EPL is not presently available for sale.

12. The method of claim 1 further comprising the step of:

updating the second location to store the product restriction indicator for a new item.

13. The system of claim 6 wherein the computer wirelessly transmits a price of an item associated with the EPL and the EPL electronically displays both the product restriction message and the price of the item.

14. The system of claim 13 wherein the price is stored in a price look up (PLU) file.

* * * * *